(12) United States Patent
Sanders et al.

(10) Patent No.: US 10,887,208 B2
(45) Date of Patent: *Jan. 5, 2021

(54) ENHANCED FLOW PROCESSING

(71) Applicant: Virtual Instruments Worldwide Inc., San Jose, CA (US)

(72) Inventors: Derek Sanders, Saratoga, CA (US); Rosanna Lee, Palo Alto, CA (US); Rangaswamy Jagannathan, Sunnyvale, CA (US)

(73) Assignee: Virtual Instruments Worldwide, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/867,685

(22) Filed: Jan. 10, 2018

(65) Prior Publication Data

US 2020/0304392 A1 Sep. 24, 2020

Related U.S. Application Data

(63) Continuation of application No. 14/834,424, filed on Aug. 24, 2015, now Pat. No. 9,935,858.

(51) Int. Cl.
*H04L 12/26* (2006.01)
*H04L 12/803* (2013.01)

(52) U.S. Cl.
CPC ...... *H04L 43/0876* (2013.01); *H04L 43/0852* (2013.01); *H04L 43/024* (2013.01); *H04L 43/0882* (2013.01); *H04L 43/103* (2013.01)

(58) Field of Classification Search
CPC . H04L 43/08; H04L 43/0876; H04L 43/0852; H04L 43/0858; H04L 43/0864; H04L 43/12

See application file for complete search history.

(56) References Cited

U.S. PATENT DOCUMENTS

| | | | |
|---|---|---|---|
| 6,370,520 B1 * | 4/2002 | Ruutu | ............ H04L 47/10 |
| 6,697,802 B2 | 2/2004 | Ma et al. | |
| 6,779,030 B1 | 8/2004 | Dugan et al. | |
| 7,076,547 B1 | 7/2006 | Black | |
| 7,376,969 B1 | 5/2008 | Njamenze et al. | |
| 7,401,007 B1 * | 7/2008 | Su | ............ G01R 19/2509 |
| | | | 324/76.11 |
| 7,702,563 B2 | 4/2010 | Balson et al. | |

(Continued)

*Primary Examiner* — Candal Elpenord
(74) *Attorney, Agent, or Firm* — Ahmann Kloke LLP

(57) ABSTRACT

A network monitoring device responds to network status data (whether "pushed" from the network device or "pulled" from the network device) to maintain a buffer of saved status data. The network status data is reordered, manipulated, and presented to users of the network monitoring device in order. The monitoring device can provide a status report of the network environment. When network status data is delayed too long, the monitoring device can discard the network status data, or reduce its weighted consideration. The monitoring device attempts to balance accuracy and latency by adjusting wait time for network status data. The monitoring device maintains a record of the amount of network status data it receives and processes from each network device and each network device's ability to provide accurate and complete information to operators and users in a distributed network monitoring environment.

10 Claims, 2 Drawing Sheets

(56) References Cited

U.S. PATENT DOCUMENTS

| | | | |
|---|---|---|---|
| 7,895,320 B1 | 2/2011 | Oggerino et al. | |
| 8,064,359 B2* | 11/2011 | Duffield | H04L 43/024 370/252 |
| 9,716,638 B1 | 7/2017 | Sanders et al. | |
| 10,009,237 B1 | 1/2018 | Sanders et al. | |
| 9,935,858 B1 | 4/2018 | Sanders et al. | |
| 2002/0152284 A1 | 10/2002 | Cambray et al. | |
| 2003/0229485 A1 | 12/2003 | Nishikawa et al. | |
| 2004/0064293 A1 | 4/2004 | Hamilton et al. | |
| 2004/0111358 A1 | 6/2004 | Lange et al. | |
| 2004/0117769 A1 | 6/2004 | Lauzon et al. | |
| 2005/0213504 A1 | 9/2005 | Enomoto et al. | |
| 2005/0276230 A1 | 12/2005 | Akahane et al. | |
| 2006/0077905 A1 | 4/2006 | Russell et al. | |
| 2006/0077981 A1 | 4/2006 | Rogers | |
| 2007/0014248 A1 | 1/2007 | Fowlow | |
| 2007/0019557 A1 | 1/2007 | Catter et al. | |
| 2007/0076605 A1* | 4/2007 | Cidon | H04L 43/0847 370/230 |
| 2007/0237079 A1 | 10/2007 | Whitehead | |
| 2007/0245051 A1 | 10/2007 | Raisoni et al. | |
| 2007/0248029 A1 | 10/2007 | Merkey et al. | |
| 2007/0271374 A1 | 11/2007 | Shomura et al. | |
| 2008/0046104 A1 | 2/2008 | Van Camp et al. | |
| 2008/0049628 A1 | 2/2008 | Bugenhagen | |
| 2008/0175145 A1* | 7/2008 | Clemm | H04L 47/10 370/229 |
| 2008/0219267 A1 | 9/2008 | Xia et al. | |
| 2010/0309812 A1 | 12/2010 | Galan Marquez et al. | |
| 2010/0322085 A1* | 12/2010 | Kalbag | H04L 43/50 370/249 |
| 2010/0322088 A1* | 12/2010 | Muthiah | G06F 9/5055 370/252 |
| 2011/0060831 A1 | 3/2011 | Ishii et al. | |
| 2014/0078903 A1* | 3/2014 | Edsall | H04L 47/29 370/235 |

\* cited by examiner

System 100

Method 200

ENHANCED FLOW PROCESSING

TABLE OF CONTENTS

| | |
|---|---|
| RELATED DOCUMENTS | 4 |
| BACKGROUND | 6 |
| FIELD OF THE DISCLOSURE | 6 |
| RELATED ART | 6 |
| SOME DRAWBACKS OF THE KNOWN ART | 8 |
| BRIEF SUMMARY | 8 |
| THIS APPLICATION | 8 |
| DEVICES AND METHODS OF USE | 8 |
| POSSIBLE APPLICABILITY | 10 |
| BRIEF DESCRIPTION OF THE DRAWINGS | 13 |
| DETAILED DESCRIPTION OF AN EMBODIMENT | 14 |
| TERMINOLOGY | 14 |
| Generality of the Description | 14 |
| Specific Phrases and Terms | 17 |
| SYSTEM ELEMENTS | 19 |
| Element Identifiers | 19 |
| Configuration of Elements | 20 |
| METHOD OF USE | 24 |
| Flow Points and Method Steps | 25 |
| ALTERNATIVE EMBODIMENTS | 29 |
| Similar Elements or Steps | 29 |
| Specification Not Limiting | 30 |
| Claims Included in Specification | 31 |
| CLAIMS | 32 |
| ABSTRACT OF THE DISCLOSURE | 34 |

RELATED DOCUMENTS

This Application relates to devices, methods, and techniques, such as described in the following documents, and documents quoted therein or related thereto:

U.S. application Ser. No. 12/180,437; filed Jul. 25, 2008; in the name of inventors Derek SANDERS, Rangaswamy JAGANNATHAN, Rosanna LEE, Kishor KAKATKAR, and Xiaohong PAN; titled "Symptom Detection Using Behavior Probability Density, Network Monitoring of Multiple Observation Values Types, and Network Monitoring Using Orthogonal Profiling Dimensions,";

U.S. application Ser. No. 12/791,704; filed Jun. 1, 2010; in the name of inventors Kishor KAKATKAR, Roy NAKASHIMA, Rosanna LEE, Jing LIU, Derek SANDERS, Rangaswamy JAGANNATHAN, and David MESSINA; titled "Recording, Replay, and Sharing of Live Network Monitoring Views,";

U.S. Provisional Application Ser. No. 62/041,130; filed Aug. 24, 2014; in the name of inventors Rosanna LEE, Rangaswamy JAGANNATHAN, and Jing LIU; titled "Push Pull Data Collection,";

U.S. application Ser. No. 14/834,367; filed Aug. 24, 2015; in the name of inventors Rosanna LEE, Rangaswamy JAGANNATHAN, and Derek SANDERS; titled "Push Pull Data Collection,";

U.S. Provisional Application Ser. No. 62/041,141; filed Aug. 24, 2014; in the name of inventors Rosanna LEE, Rangaswamy JAGANNATHAN, and Jing LIU; titled "Cross-silo Time Stitching,";

U.S. Provisional application Ser. No. 14/834,371; filed Aug. 24, 2015; in the name of inventors Rosanna LEE, Rangaswamy JAGANNATHAN, and Derek SANDERS; titled "Cross-silo Time Stitching,".

U.S. Provisional Application Ser. No. 62/041,140; filed Aug. 24, 2014; in the name of inventors Jing LIU, Rangaswamy JAGANNATHAN, and Rosanna LEE; titled "Enhanced flow processing,";

U.S. application Ser. No. 14/834,424; filed Aug. 24, 2015; in the name of inventors Rosanna LEE, Rangaswamy JAGANNATHAN, and Derek SANDERS; titled "Enhanced flow processing,";

U.S. Provisional Application Ser. No. 62/041,143; filed Aug. 24, 2014; in the name of inventors Derek SANDERS, Rangaswamy JAGANNATHAN, and Rosanna LEE; titled "Self-learning and best-practices profiling and alerting with relative and absolute capacity,";

U.S. application Ser. No. 14/834,426; filed Aug. 24, 2015; in the name of inventors Derek SANDERS, Rangaswamy JAGANNATHAN, and Rosanna LEE; titled "Self-learning and best-practices profiling and alerting with relative and absolute capacity,";

U.S. Provisional Application Ser. No. 62/041,135; filed Aug. 24, 2014; in the name of inventors Rosanna LEE, Derek SANDERS, Rangaswamy JAGANNATHAN, and Jing LIU; titled "Storm detection, analysis, and remediation,";

U.S. application Ser. No. 14/834,428; filed Aug. 24, 2014; in the name of inventors Rosanna LEE, Rangaswamy JAGANNATHAN, and Derek SANDERS; titled "Storm detection, analysis, remediation, and other network behavior,";

A Technical Appendix having 1 page, titled "Xangati solution architecture extensible across cloud applications and cloud stacks," a copy of which is enclosed herewith, and incorporated by reference as if fully set forth herein.

Each and every one of these documents, as well as all documents cited therein, is hereby incorporated by reference as if fully recited herein.

This Application claims priority of each and every one of these documents, as well as to all documents incorporated therein, to the fullest extent possible.

CONTINUATION

This Application is a continuation of case Ser. No. 14/834,424 and no new matter and been added.

BACKGROUND

Field of the Disclosure

This Application relates to devices and methods relating to enhanced flow processing, and other matters.

For example, this Application can include information relating to enhanced flow processing in a distributed network monitoring environment.

Other and further possibilities are described herein.

Related Art

One problem that has arisen, particularly in the field of network monitoring, is that some network devices will provide status data more quickly, and some more slowly. This can have the effect that, when status data arrives at a network monitoring device, some of the data might be out of order. Some of the data might be so delayed as to be too late to consider when presenting a status of the network to an operator or user. One possibility is to maintain a buffer, and to maintain incoming status data in that buffer, ordering the status data so that when the status data is extracted from the buffer, the status data information will be in order. While this can allow status data to arrive out of order and still be properly considered as if it arrived in-order, it is subject to at least some drawbacks.

One drawback is that if the incoming status data is very late, either the buffer would have to be very large, or the status data would eventually have to be removed from the buffer, with the effect that the status data would be removed from consideration. This would have the consequent effect that the network monitoring device's report on the status of the network would be less faithful to reality, and if sufficiently less faithful to reality, not as valuable to the operator or user.

One drawback is that if there is a large amount of network traffic to consider, the network monitoring device would not have the resources to process all of the available status data within a reasonable amount of time, with the effect that some of the status data, at least, would not be considered within a reasonable time. This would have the consequent effect that the network monitoring device would have a choice between either delaying reports to the operator or user, possibly to the point where that status data would not be as valuable.

The network monitoring device thus effectively has a choice between providing information that is not as accurate as possible, or providing information that is not as useful as possible.

This can present multiple problems for monitoring devices in the distributed network monitoring environment.

Some Drawbacks of the Known Art

Each of these issues, either alone or in combination with others, at some times, or in some conditions, can cause one or more problems in aspects of effective and efficient reporting of status data to operators or users, particularly when it is desired that the status data is both as accurate and useful as possible, and particularly in a distributed network monitoring environment.

BRIEF SUMMARY

This Application

This Application provides patentable subject matter that can ameliorate at least some of the problems described above, as well as others.

Devices and Methods of Use

A system includes an apparatus, such as a network monitoring device, capable of responding to information received from a network device (whether "pushed" from the network device on its own initiative, or whether "pulled" from the network device by request from the network monitoring device and response by the network device). The network monitoring device maintains a buffer of saved status data, with the effect that the status data can be reordered upon receipt, manipulated, and presented to operators and users in an order in which it was generated by the network devices themselves. This has the salutary effect that the network monitoring device can report, at any given moment, a substantially accurate report of the status of the distributed network monitoring environment.

The network monitoring device maintains a record of how delayed the status data message packets are, either on an average basis, or individually for each particular network device. When status data message packets are delayed too long to retain, or by a sufficient time that they are no longer very useful, the network monitoring device can discard those status data message packets, or it can reduce the amount of consideration it gives to the information included in those message packets. The network monitoring device adjusts the amount of time it is willing to wait for status data, either from the network as an average, or individually for each network device. In either case, the network monitoring device attempts to balance the accuracy and latency of the information, so hat the loss of accuracy and loss of latency are collectively minimized, with the effect that the operator or user can obtain the best information possible.

The network monitoring device also maintains a record of how much status data it receives and is required to process, particularly in response to the amount of status data it is able to process reliably. Similar to inaccuracy from dropping some of the status data, inaccuracy from miscalculation is also untoward. Accordingly, the network monitoring device maintains a sampling rate for status data, somewhere between evaluating all of the status data, when it is capable of so doing, and evaluating only a small portion of the status data, when that is the best it can do. The network monitoring device attempts to balance the degree of sampling it performs, against both the possibility of error and the certainty of latency (as, the more information it processes, within the scope of a finite amount of resources with which to process that information, the more latency will be required). The network monitoring device maintains a record, again, either for the network as an average, or individually for each network device, of the amount of status data it receives and processes, and the effect on its ability to provide accurate, complete, and timely information to operators and users, in a distributed network monitoring environment.

Other and further details are included herein.

This Application

After reading this Application, those skilled in the art would recognize that techniques shown in this application are applicable to more than just the specific embodiments shown herein. For example, the applicability of the techniques shown herein can broadly encompass a wide variety of network monitoring techniques. These can include "push" techniques, in which the network device pushes the status data out to the network monitoring device, "pull" techniques, in which the network monitoring device explicitly requests status data information from the network device, "polling" techniques, in which the network monitoring device looks to each network device in a round-robin or similar fashion to determine if any status data information is available, "shared memory" techniques, in which the network monitoring device and the network device can each include one or more portions of memory in which status data information can be maintained, and otherwise.

Moreover, after reading this application, those skilled in the art would recognize that techniques shown in this application are applicable, or can be made applicable with relatively small effort that does not include undue experiment or further invention, to circumstances in which the status data information is fuzzy, probabilistic, unclear, unknown, or otherwise. For example, while this Application is primarily directed to status data information that can be explicitly stated and maintained in non-volatile (or volatile) storage, or in memory or mass storage, in the context of the invention, there is no particular requirement for any such limitation. In such cases, the status data can include information that is only meaningful when examined over a period of time, or when combined with other information, or when interpreted by a user—or by another computing device, a machine learning system, an Artificial Intelligence system, one or more human beings (possibly with expert knowledge).

Moreover, after reading this application, those skilled in the art would recognize that techniques shown in this application are applicable, or can be made applicable with relatively small effort that does not include undue experiment or further invention, to circumstances in which the status data information is maintained in a data structure other than a buffer, such as when the status data information is maintained due to circumstances other than network delay. For example, the status data can be maintained in a data structure that includes one or more hashing techniques, one or more hierarchical techniques (such as a tree structure, directed graph, or lattice), one or more holographic techniques (such as a content-addressable memory, a Kohonen network, a biochemical computing device, or otherwise), or some other technique.

Moreover, after reading this application, those skilled in the art would recognize that techniques shown in this application are applicable, to many other circumstances not explicitly described, such as status data that is distinguished by its application to activity with respect to location in an area or region (such as a particular set of network devices or endpoints in one or more selected places), or in another state-space (such as a particular set of network devices or endpoints using one or more virtual machines, virtual machine applications, real or virtual machine communication ports, or otherwise).

Other and further techniques, also shown or suggested by this Application, are also applicable to more than just the specific embodiments described herein.

DETAILED DESCRIPTION OF AN EMBODIMENT

Terminology

Generality of the Description

Figure 1:
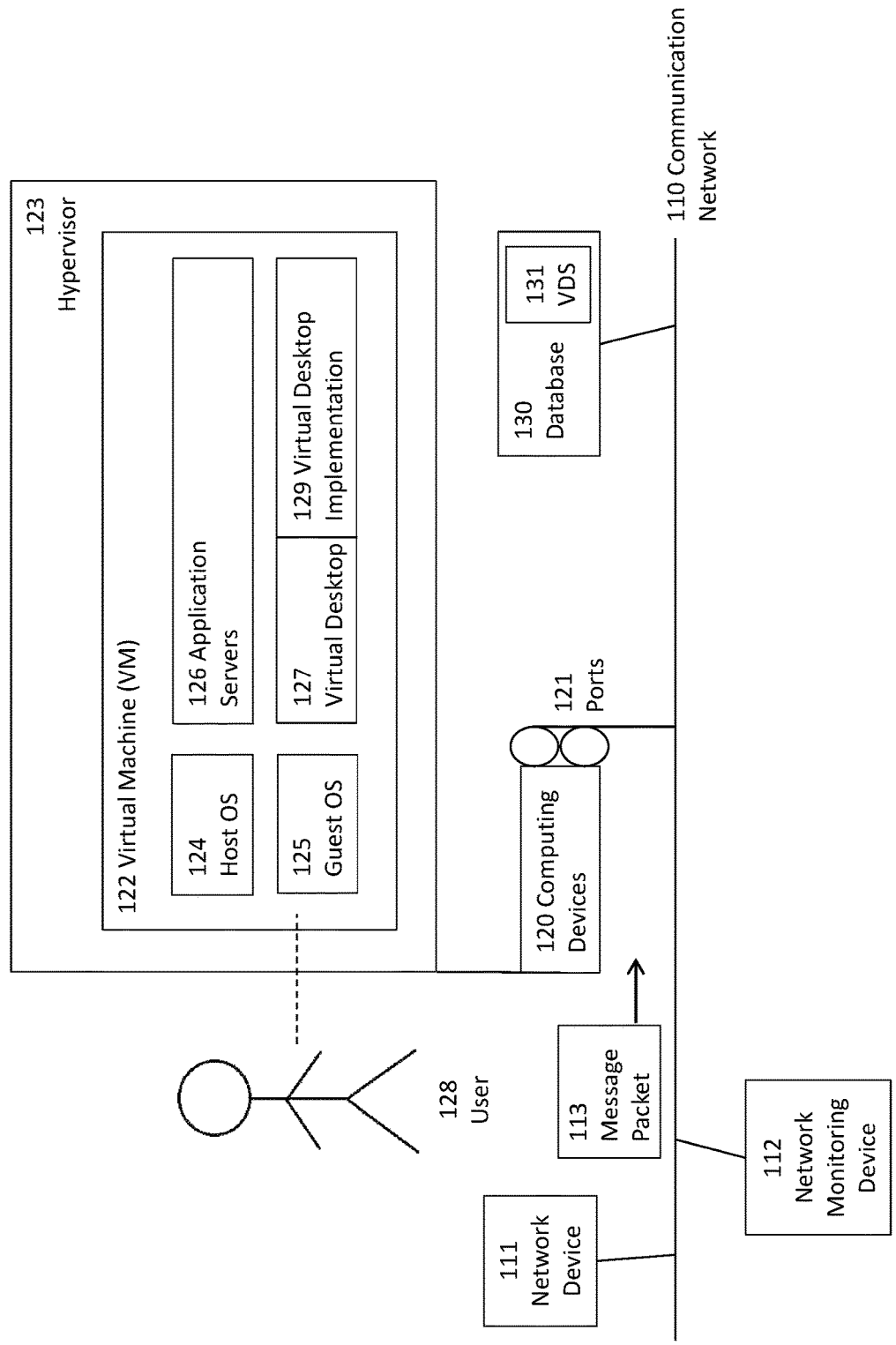
FIG. 1 shows a conceptual drawing of a system, and making the same.

Ideas and technologies shown or suggested by this Application should be thought of in their most general form, including without limitation, considering one or more of the following:

After reading this application, those skilled in the art would realize that the invention is not in any way limited to the specifics of any particular example. Many other variations are possible that remain within the content, scope and spirit of the invention, and these variations would be clear to those skilled in the art, without further invention or undue experiment.

The phrases and terms "Application," "this Application," "this Disclosure," and variants thereof, generally refer to this Specification, Drawings, Figures, and Claims, all other parts of this Application, and all facts known in the art at the time of filing, and all facts that can be rationally concluded therefrom.

When an apparatus element or a method step is said to "include" or "perform," and variants thereof, or otherwise be restricted in some way, this Application should be read that the subpart of the apparatus element, or the sub-step of the method, and the restriction mentioned, is only optional, not required. After reading this Application, those skilled in the art would recognize that those apparatus elements or method steps need not necessarily include or perform those particular subparts or sub-steps. In the context of the invention, no such particular subparts or sub-steps are particularly required. In an alternative embodiment, apparatus elements or method steps without those sub-parts or sub-steps would be workable, are within the scope and spirit of the invention, and would not require undue experiment or further invention.

The phrases and terms "in one example," "in one embodiment," "in one implementation," "in one scenario," "in possible examples," "in possible embodiments," "in possible implementations," "in possible scenario," and variants thereof, generally refer that a particular characteristic, feature, or structure, described herein is included in at least one embodiment of the invention. Multiple uses of this phrase do not necessarily all refer to the same embodiment. Rather, the specific particular characteristic, feature, or structure, described herein might be combined in any suitable manner into one or more distinct possible embodiments.

The phrases and terms "perform," and variants thereof, generally refer (in the context of a program of instructions) any one or more means by which those instructions are executed or interpreted, or a device (such as a computing device) otherwise conducts the process indicated by that program of instructions. A program of instructions can be detected or interpreted at one location, and executed or its process conducted at another location. A program of instructions can be performed by a portion of a device, rather than the entire device, or by one or more devices, or by one or more portions of devices (the same device or different devices). A program of instructions can be per-formed by an emulated device, such as a virtual machine, "sandbox" environment, or otherwise. A program of instructions can be performed in part, halted or paused or stopped, transferred to another device, in whole or in part, and possibly continued.

The phrases and terms "relatively," and variants thereof, generally refer any relationship in which a comparison is possible, including without limitation "relatively less," "relatively more," and otherwise. In the context of the invention, where a measure or value is indicated to have a relationship "relatively," that relationship need not be precise, need not be well-defined, and need not be by comparison with any particular or specific other measure or value. For one example, whenever a measure or value is "relatively increased" or "relatively more," that comparison need not be with respect to any known measure or value, but might be with respect to a measure or value held by that measurement or value at another place or time, or with respect to a measure or value commonly used in the art.

The phrases and terms "substantially," and variants thereof, generally refer any circumstance in which a determination, measure, value, or otherwise; is equal, equivalent, nearly equal, nearly equivalent, or approximately; what the measure or value is recited to be. For example, the phrases and terms "substantially all," and variants thereof, generally refer any circumstance in which all, except possibly a relatively minor amount or number, have the stated property. For example, the phrases and terms "substantially none," and variants thereof, generally refer any circumstance in which none, except possibly a relatively minor amount or number, have the stated property. For example, the phrases and terms "substantial effect," and variants thereof, generally refer any circumstance in which an effect might be detected or determined.

The phrases and terms "techniques," and variants thereof, generally refer any material suitable for description, including without limitation all such material within the scope of patentable subject matter. Whenever a method step is described, those skilled in the art would know, without further invention or undue experiment, that this application thereby also describes (1) at least a first product, such as one maintaining instructions that are interpretable by a computing device, where those instructions direct one or more devices to perform that method step; and (2) at least a second product, such as one capable of performing that method step.

Specific Phrases and Terms

One or more of the following phrases and terms can be used in this Application. Where clear from the context, they can have the meanings described herein. After reading this Application, those skilled in the art would recognize that these phrases and terms can have other, broader and further, meanings as well or instead.

The terms "collate," and variants thereof, generally indicate that the status data information can be collected in an arrangement, order, structure, or otherwise, not equal to the way it was collected. For example, status data information can be considered to be collated when it arrives out of time order at the network monitoring device from the network device, due to network delay or some other characteristic of the communication between the network monitoring device and the network device. Alternatively, status data can be considered to be collated when it arrives in a first format and is converted to a second format by one or more computing devices.

The phrases "data storage," and variants thereof, generally indicate one or more real or virtual devices that are capable of maintaining data or information for later access, either by the same device that stored the data or information, or by another device.

The phrases "monitoring device," "network monitoring," and variants thereof, generally indicate one or more real or virtual devices that can perform the functions of monitoring network devices, or their activity, such as by determining or gleaning status data information, collating that status data information, and processing that collated status data information.

The phrases "network device," and variants thereof, generally indicate any device including computational capacity, such as a real or virtual processing substrate, a real or virtual data storage element, a real or virtual network communication element, a real or virtual memory, or otherwise.

The phrases "local monitoring element," "reporting element," and variants thereof, generally indicate any portion of one or more network devices, or some combination or conjunction thereof, that can include the capability of generating a report of status data information. For example, a network device that can include a virtual machine, when the virtual machine can provide status data information to the network monitoring device, can include a reporting element.

The phrases "status data," and variants thereof, generally indicate any information indicating activity or capability of a network device, such as processing capacity, memory capacity, storage capacity, network activity, or otherwise. Status data is not generally limited to capacity, and can include expandability, latency, reliability, size, or any other feature useful in the field of computing that can include computing devices.

The terms "silo," and variants thereof, generally indicate any division of status data information into categories of activity, capability, capacity, or otherwise. For example, network bandwidth and processing power can be in distinct silos of status data information, as can the difference between either of those measures and any measure from the group:

memory, data storage, application servers, virtual machine capacity, or otherwise.

After reading this application, those skilled in the art would realize that the invention is not in any way limited to the specifics of any particular example. Many other variations are possible that remain within the content, scope and spirit of the invention, and these variations would be clear to those skilled in the art, without undue experiment or further invention.

Any terms appearing in the figures but not explicitly described in this Application should be apparent to those skilled in the art.

System Elements

FIG. 1 shows a conceptual drawing of a system, and method of making the same.

In possible implementations, a system 100 can include elements described herein, other elements shown in the figure, and possibly other elements. Not all elements are required. Elements should be considered optional, unless otherwise specified or unless clearly obvious for operation of the system. Elements may also be embodied in one or more devices, not necessarily in only a single device.

FIG. 1, Element Identifiers

System elements and sub-elements are sometimes described herein with respect to the following reference numbers and/or names:

100—system (as shown in FIG. 1)
110—communication network
111—network device
112—network monitoring device
113—message packet
120—computing devices
121—ports
122—virtual machines (VM's)
123—hypervisor
124—host operating system (OS)
125—guest operating system (OS)
126—application servers
127—virtual desktop
128—user
129—virtual desktop implementation
130—database
131—virtual data stores (VDS's)

FIG. 1, Configuration of Elements

FIG. 1 shows a conceptual drawing of a system, and method of making the same.

A system 100 includes elements described herein, other elements shown in the figure, and possibly other elements. Not all elements are required. Elements should be considered optional, unless otherwise specified or unless clearly obvious for operation of the system.

Communication Network

The system 100 can include a communication network 110, suitably disposed to interact with other elements described herein. In general, when elements described herein communicate, they do so using the communication network 110. The communication network 110 can include one or more network devices 111, such as network routers, and can be disposed as a TCP/IP network, an IEEE 802.11 wireless communication network 110, an Ethernet or other local communication network 110, a subdivision of the Internet, or otherwise. The communication network 110 can also include one or more network monitoring devices 112, coupled to the communication network 110, and capable of reviewing message packets 113 that are transmitted on the communication network 110, without interfering with transmission or reception of those message packet 113.

Computing Device

The system 100 (in particular, the network devices 111) can include one or more computing devices 120, such as computing servers, quantum computers, or other types of computing devices. Each particular computing device 120 of the one or more computing devices 120 can include one or more ports 121 coupling the particular computing device 120 to the communication network 110, with the effect that the particular computing device 120 can exchange message packets 113 with other devices coupled to the communication network 110.

Virtual Machine

Each particular computing device 120 can also include one or more virtual machines 122, each virtual machine 122 being capable of being controlled by a hypervisor 123 that is executed by the particular computing device 120. Each virtual machine 122 can include a host operating system 124 (controlled by the hypervisor 123) and one or more guest operating systems 125 (each controlled by a host operating system 124). Each virtual machine 122 can also include one or more application servers 126 (controlled by the guest operating system 125), each capable of receiving messages from a client device (a particular network device 111, as otherwise and further described herein) and capable of responding to those messages.

Virtual Desktop

Each virtual machine 122 can execute an application server 126 that presents a virtual desktop 127 to one or more users 128. In such cases, the virtual desktop 127 can include one or more output elements (such as a display screen and/or a speaker), and be responsive to one or more input devices (such as a keyboard and/or a pointing device), each showing one or more application programs executing in a windowing system, with the effect that a particular user 128 can interact with the virtual desktop 127, using the communication network 110, as if the particular user 128 were physically present at the virtual machine 122 and, by implication, at the particular computing device 120 on which that virtual machine 122 is executed.

Virtual Desktop Implementation

In one embodiment, one or more of those virtual desktops 127 can include, or be coupled to, a virtual desktop implementation 129. The virtual desktop implementation 129 can include a software program executed by the virtual machine 122, capable of exchanging message packets 113 with the user 128, in which the message packets 113 can be substantially compressed and can include substantial error correcting coding. This can have the effect that communication between the virtual desktop 127 and the user 128 can be sufficiently smooth as if the virtual desktop 127 and the user 128 were physically local, and that their exchange of messages using the communication network 110 were substantially invisible to the user 128.

Database

In one embodiment, the system 100 can include a database 130, or other data maintenance or data storage element, capable of maintaining status data information communicated, using the message packets 113, between the one or more network devices 111 and the one or more network monitoring devices 112. The database 130 can be disposed substantially locally, such as substantially directly coupled to the communication network 110, or can be disposed substantially remotely, such as substantially indirectly coupled to other elements that are eventually coupled to the communication network 110. The database 130 can include one or more real or virtual data stores 131, such as disk drives, flash drives, or other storage techniques.

Network Monitoring

In one embodiment, the system 100 can include one or more network monitoring devices 112, as described herein. The network monitoring devices 112 can be disposed to exchange message packets 113 with the one or more network devices 111, the one or more computing devices 120, the one or more virtual machines 122, the one or more virtual desktop implementations 129, the one or more databases 130, and any other elements coupled to the system 100. For example, the one or more network monitoring devices 112 can exchange message packets 113 with the one or more network devices 111, with the effect that the network monitoring devices 112 can receive status data information with respect to any interaction in the system 100. This can include interactions between any pair of devices (whether same or different) described herein.

Alternative Embodiments

After reading this Application, those having ordinary skill in the art will recognize that the particular elements described herein, their particular cooperation and organization, and their particular use as described herein, can be substantially altered while remaining within the scope and spirit of the invention, and that such alterations would work without undue experiment or further invention.

Method of Use

Figure 2:
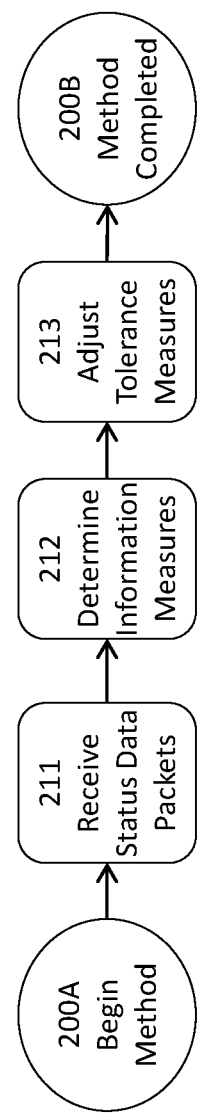
FIG. 2 shows a conceptual drawing of a method of operation.

FIG. 2 shows a conceptual drawing of a method of operation.

In possible implementations, a method 200 includes flow points and method steps as described herein, other elements shown in the figure, and possibly other elements. Not all flow points or method steps are required. Flow points or method steps should be considered optional, unless otherwise specified or unless clearly obvious for operation of the system.

The system 100, or portions of the system 100, can or be used while performing the method 200, or portions of the method 200. Where described herein that a flow point is reached, or a step is performed, by the method 200, it should be understood from the context, or from the figure, which portions (or all of them) of the system 100, reaches the flow point or takes the actions to perform the step.

Although the nature of text necessitates that the flow points and steps are shown in a particular order, in the context of the invention, there is no reason for any such limitation. The flow point may be reached, and the steps may be performed, in a different order, or may be performed by co-routines or recursive functions, or may be performed in a parallel or pipelined manner, or otherwise.

One or more portions of the method 200 are sometimes described as being performed by particular elements of the system 100 described with respect to FIG. 1, or sometimes by "the method" itself. When a flow point or method step is described as being performed by "the method," it can be performed by one or more of those elements, by one or more portions of those elements, by an element not described with respect to the figure, by a combination or conjunction thereof, or otherwise.

FIG. 2, Flow Points and Method Steps

Beginning of Method

A flow point 200A indicates a beginning of the method 200. At this flow point, the method 200 can initialize variables and reset/set state, as appropriate.

Receive Status Data Packets

At a step 211, (receiving status data message packets 113) the network monitoring device 112 receives status data message packets 113 from the network devices 111, such as network routers, computing devices 120, virtual machines 122, virtual desktop implementations 129, databases 130, and any other elements coupled to the system 100. In one embodiment, status data message packets 113 include information with respect to the status of the distributed network monitoring environment, including such information as number of packets that have been processed by the system 100, number of octets in those message packets 113, and other status data information. As part of this step, the network monitoring device 112 makes a record of the status data information, as it gleans that information from the message packets 113.

Determine Information Measures

At a step 212, (determining information measures) the network monitoring device 112 determines a set of information with respect to its parameters with respect to its interaction with the network devices 111. In one embodiment, and as part of this step, this can include one or more of the following measures with respect to the interaction between the network devices 111 and the network monitoring device 112:

MEASURE OF LATENCY DATA LOSS—a measure of how much status data is lost because it arrives too late from the network devices 111 to be considered by the network monitoring device 112;

MEASURE OF TOLERABLE UNRELIABILITY—a measure of how much the network monitoring device 112 is willing to tolerate unreliability in the results of its computations, in response to factors similar to those with respect to "rate of reliable processing";

MEASURE OF LATENCY TOLERANCE—a measure of how much latency for receiving status data from the network devices 111 that the network monitoring device 112 will tolerate before eliminating the status data, equivalent to a tolerated length of a buffer 201 for that status data;

MEASURE OF RECEIPT LATENCY—a measure of latency for receiving status data from the network devices 111;

MEASURE OF SAMPLING RATE—a measure of what fraction of status data message packets 113, or of octets, the network monitoring device 112 is willing to review, where 100% represents all of them;

RATE OF INFORMATION RECEIPT—a rate at which the network monitoring device 112 receives data from the network devices 111, which can include a rate at which the network monitoring device 112 receives message packets 113 from the network devices 111, and a rate at which the network monitoring device 112 octets from the network devices 111;

RATE OF RELIABLE PROCESSING—a rate at which the network monitoring device 112 believes it can reliably receive and process status data from the network devices 111, in response to the rate of information receipt; this can also be responsive to a parameter set at a factory, a parameter set by an operator or a user, a parameter adjusted in response to actual experience (such as by measuring the bit error rate (BER) that the network monitoring device 112 experiences at each rate, or by determining the parameter adaptively in response to the absence or presence of errors, or by Bayesian learning, or by some other machine learning or statistical technique, and/or otherwise;

TREATMENT OF EXCESS LATENCY—a method by which the network monitoring device 112 can determine how to treat status data message packets that are too late: (1) the network monitoring device 112 can discard them; the network monitoring device 112 can maintain a statistical measure of a reduced amount of consideration it gives to the information included in those message packets 113 (for example, the network monitoring device 112 can maintain an exponential moving average (EMA or XMA) with respect to message packets 113 that have "timed out" of being maintained in the buffer 201).

As part of the steps of measuring interactions between the network devices 111 and the network monitoring device 112, the latter computes a set of statistical measures with respect to those interactions; such as averages for individual network devices 111, averages for types of network devices 111 (such as "all data storage elements"), averages for the entire system 100, and other statistical measures thereof. For example, the network monitoring device 112 can determine a mean, median, and standard deviation for those values, a cumulative distribution function (cdf), or a best match to another statistical distribution (such as a logistic distribution).

Method Completed

At a step 213, (adjusting tolerance measures) the network monitoring device 112 determines, in response to the set of statistical measures, whether or not to, and if so, by how much to, adjust its tolerance of latency, data loss, unreliability, sampling rate, and treatment of excess latency. In one embodiment, and as part of this step, the network monitoring device 112 determines any adjustment in response to a weighted average (or other formula) of the statistical measures. In one embodiment, and as part of this step, the network monitoring device 112 determines which parameters to adjust first in response to which parameters should be adjusted most, in response to the statistical measures, although in alternative embodiments, the network monitoring device 112 may use other and further techniques to determine which parameters to adjust in what order.

Method Completed

A flow point 200B indicates that the method 200 has been completed.

At this flow point, the method 200 can return to the earlier flow point 200A, when appropriate.

When the user 101 desires to repeat the method 200, the method 200 proceeds with the flow point 200A.

Alternative Embodiments

While this application is primarily described with respect to enhanced flow processing, after reading this Application, those of ordinary skill in the art will recognize that there is no particular requirement for any such limitation.

For example, techniques described herein can also be applied to other circumstances in which it is desired to retrieve dynamic data and collate that dynamic data (possibly received out of order) into a unified sequence, which is in an specified order.

For example, the techniques described and suggested herein (including machines, methods, articles of manufacture, and compositions of matter) can be applied to any time-sensitive system, including sensors, robotics, machine learning, dynamic compression and expansion of data streams, and/or otherwise.

Similar Elements or Steps

Individual elements or method steps of the described embodiments could be replaced with substitutes that perform similar functions in other contexts.

Elements of the system are described herein with respect to one or more possible embodiments, and are not intended to be limiting in any way. In the context of the invention, there is the particular requirement for any such limitations as described with respect to any elements of the system. For one example, individual elements of the described apparatuses could be replaced with substitutes that perform similar functions. Moreover, as described herein, many individual elements of the described apparatuses are optional, and are not required for operation.

Moreover, although control elements of the one or more described apparatuses are described herein as being executed as if on a single computing device, in the context of the invention, there is no particular requirement for any such limitation. For one example, the control elements of the one or more described apparatuses can include more than one computing device (or more than one specialized computing device), not necessarily all similar, on which the element's functions are performed.

For one example, while some embodiments are generally described herein with respect to specific steps to be performed by generalized computing devices, in the context of the invention, there is no particular requirement for any such limitation. In such cases, subject matter embodying the invention can include special-purpose devices; and can include special-purpose hardware devices having the elements described herein, and having the effect of performing the steps described herein; and combinations and/or conjunctions thereof. Embodiments of the invention are not necessarily limited to computing de-vices, but can also include any form of device or method that can improve techniques for improving the effect of the machine operations described herein.

In one particular implementation, instructions capable of being interpreted for control of devices can be provided as a computer program product, such as instructions that are maintained on a computer-readable storage medium or a non-transitory machine-readable medium. The non-transitory medium can include a magnetic, optical or magneto-optical storage medium; a flash storage medium; and/or otherwise.

Specification Not Limiting

After reading this Application, those skilled in the art would recognize that the invention is not limited to only the specifically described embodiments, that many variations are within the scope and spirit of the invention, and would be workable without undue experiment or further invention.

Claims Included in Specification

The Claims in this Application are hereby included by reference in the text of the Specification.

The invention claimed is:

1. A method, including steps of:
coupling a network monitoring device to a dynamic network environment, the network monitoring device including: (A) a buffer of data entries responsive to status of the network environment and having been reordered from the order they were received, (B) a record of delay associated with the data entries sufficient to determine an amount of weight to give those data entries;
dynamically adjusting, by the network monitoring device, at least an amount of weight to give to the data entries responsive to the record of delay, the amount of weight being disposed to balance accuracy and latency of reports on status of the network environment;
associating, by the network monitoring device, more or less of the weight to more recent data from the network environment responsive to the record of delay;
processing the data entries and the weights associated therewith to provide reports on status of the network environment to an operator of the network monitoring device; and
including steps of determining a projected accuracy of reports on status of the network environment in response to a rate of receiving information from the network environment, the rate of receiving information being responsive to a statistical measure of experience with data from the network environment.

2. The method as in claim 1, including steps of dynamically adjusting one or more of: a sampling rate of data from the dynamic network environment, a size of the buffer, a rate of receiving data from the dynamic network environment, a rate of requesting data from the dynamic network environment, wherein the network monitoring device maintains an amount of data to consider to balance projected accuracy and latency of reports on status of the network environment.

3. The method as in claim 1, including steps of, upon receipt of each said data entry, placing it in a location in the buffer so that their order in the buffer differs from the order they were received.

4. The method as in claim 1, wherein the buffer has a first defined set of data entries having substantially a first amount of weight to give those data entries, and a second defined set of data entries having substantially a second amount of weight to give those data entries.

5. The method as in claim 1, wherein the network monitoring device includes a record of an amount of data it is able to process reliably, the record of an amount of data being sufficient to allow the network monitoring device to balance projected accuracy and latency of reports on status of the network environment.

6. A system including:
a network monitoring device disposed to be coupled to a dynamic network environment, the network monitoring device including: (A) a buffer of data entries responsive to status of the network environment and having been reordered from the order they were received, (B) a record of delay associated with the data entries sufficient to determine an amount of weight to give those data entries;
dynamically adjusting, by the network monitoring device, at least an amount of weight to give to the data entries responsive to the record of delay, the amount of weight being disposed to balance accuracy and latency of reports on status of the network environment;
associating, by the network monitoring device, more or less of the weight to more recent data from the network environment responsive to the record of delay; and
processing the data entries and the weights associated therewith to provide reports on status of the network environment to an operator of the network monitoring device, wherein the network monitoring device is disposed to determine a projected accuracy of reports on status of the network environment in response to a rate of receiving information from the network environment, the rate of receiving information being responsive to a statistical measure of experience with data from the network environment.

7. The system as in claim 6, wherein the network monitoring device is disposed to dynamically adjust one or more of: a sampling rate of data from the dynamic network environment, a size of the buffer, a rate of receiving data from the dynamic network environment, a rate of requesting data from the dynamic network environment, wherein the network monitoring device maintains an amount of data to consider to balance projected accuracy and latency of reports on status of the network environment.

8. The system as in claim 6, wherein the network monitoring device is disposed to, upon receipt of each said data entry, place it in a location in the buffer so that their order in the buffer differs from the order they were received.

9. The system as in claim 6, wherein the buffer has a first defined set of data entries having substantially a first amount of weight to give those data entries, and a second defined set of data entries having substantially a second amount of weight to give those data entries.

10. The system as in claim 6, wherein the network monitoring device includes a record of an amount of data it is able to process reliably, the record of an amount of data being sufficient to allow the network monitoring device to balance projected accuracy and latency of reports on status of the network environment.

\* \* \* \* \*